(12) United States Patent
Kaneko et al.

(10) Patent No.: US 11,326,890 B2
(45) Date of Patent: May 10, 2022

(54) INFORMATION PROCESSING APPARATUS, INFORMATION PROCESSING METHOD, AND INFORMATION PROCESSING SYSTEM

(71) Applicant: TOYOTA JIDOSHA KABUSHIKI KAISHA, Toyota (JP)

(72) Inventors: Yusuke Kaneko, Toyota (JP); Junya Masui, Nagoya (JP); Yui Nakamura, Nagoya (JP); Ai Fujimura, Nisshin (JP); Keisuke Tsujimoto, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 388 days.

(21) Appl. No.: 16/509,545

(22) Filed: Jul. 12, 2019

(65) Prior Publication Data

US 2020/0018610 A1   Jan. 16, 2020

(30) Foreign Application Priority Data

Jul. 12, 2018   (JP) .............................. JP2018-132416

(51) Int. Cl.
| | |
|---|---|
| *G01C 21/00* | (2006.01) |
| *G01C 21/34* | (2006.01) |
| *G06Q 30/02* | (2012.01) |
| *G06Q 50/30* | (2012.01) |

(52) U.S. Cl.
CPC ..... *G01C 21/3415* (2013.01); *G01C 21/3438* (2013.01); *G06Q 30/0207* (2013.01); *G06Q 50/30* (2013.01)

(58) Field of Classification Search
CPC ............ G01C 21/3415; G01C 21/3438; G06Q 30/0207; G06Q 50/30
See application file for complete search history.

(56) References Cited

U.S. PATENT DOCUMENTS

| | | | |
|---|---|---|---|
| 2017/0351990 A1 | 12/2017 | Hecht et al. | |
| 2018/0374014 A1* | 12/2018 | Matsui | G08G 1/202 |
| 2020/0096354 A1* | 3/2020 | Duquene | G08G 1/096844 |

FOREIGN PATENT DOCUMENTS

CN   105809484 A   7/2016

* cited by examiner

*Primary Examiner* — Adam M Alharbi
(74) *Attorney, Agent, or Firm* — Oliff PLC (57) ABSTRACT

An information processing apparatus provided with a communicator that receives request data which is a request relating to a change in a traveling route of a vehicle from a first user among two or more users traveling in the same vehicle and a processor that executes determining incentives to be granted to second users accompanying the change in the traveling route, wherein the second users are a part of or all of the two or more users excluding the first user, presenting incentive information on the determined incentives and inquiries about whether or not to accept the change in the traveling route to the second users and creating granting data for granting the determined incentives to the second users when the second users accept the change in the traveling route.

5 Claims, 8 Drawing Sheets

ROUTE CHANGE REQUEST HAS BEEN GENERATED.
DO YOU PERMIT ROUTE CHANGE?

ARRIVAL AT DESTINATION IS ESTIMATED TO DELAY 5 MINUTES.
10 POINTS ARE GRANTED.

PERMIT    REJECT

INCENTIVE INFORMATION TABLE

| USER ID | POSSESSED POINTS | POINTS THAT CAN BE PROVIDED |
|---|---|---|
| U101 | 1000 | 500 |
| U102 | 200 | 200 |
| U103 | 500 | 200 |
| ... | ... | ... |

FIG. 7

RIDING RESERVATION INFORMATION TABLE

| RIDING RESERVATION ID | DRIVING USER ID | RIDING USER ID | SCHEDULED JOINING POINT | SCHEDULED JOINING TIME | PASSING SPOT #1 | SCHEDULED TIME OF ARRIVAL AT PASSING SPOT #1 | DESTINATION | SCHEDULED TIME OF ARRIVAL AT DESTINATION | PRESENCE OR ABSENCE OF FELLOW PASSENGERS |
|---|---|---|---|---|---|---|---|---|---|
| 1 | S001 | C001 | f | 8:00 | | | g | 9:00 | NO |
| 2 | S002 | C002 | h | 8:30 | | | e | 9:30 | YES |
| 3 | S002 | C003 | i | 8:45 | | | j | 9:15 | NO |
| ⋮ | ⋮ | ⋮ | | | | | | | |

FIG. 8

INFORMATION PROCESSING APPARATUS, INFORMATION PROCESSING METHOD, AND INFORMATION PROCESSING SYSTEM

CROSS REFERENCE TO RELATED APPLICATION

This application claims the benefit of Japanese Patent Application No. 2018-132416, filed on Jul. 12, 2018, which is hereby incorporated by reference herein in its entirety.

BACKGROUND

Technical Field

The present disclosure relates to a technique for a plurality of users to travel by sharing the same vehicle.

Description of the Related Art

Travelling modes in which a plurality of passengers travel by sharing one vehicle for the purpose of relieving traffic congestion, saving fuel expenses, environment countermeasures or the like (ride sharing) are becoming popular mostly in foreign countries. Furthermore, in such a traveling mode, techniques for matching a plurality of users are being developed.

As a technique associated with this, Patent Document 1 describes a system that acquires data relating to interactions carried out by a plurality of users traveling by sharing the same vehicle and further provides information based on the interactions.

CITATION LIST

Patent Document

[Patent document 1] US Patent Application Publication No. 2017/0351990

It is often the case that in general ride sharing, people who are strangers to one another travel by sharing the same vehicle. Therefore, even when a request for a route change is generated, for example, a request that a certain passenger be carried to his/her destination first or a request that a detour be made, such a route change may cause other fellow passengers to arrive at their destinations late, and so it may be difficult to obtain agreement on the route change from the fellow passengers.

The present disclosure has been implemented in view of the above problem, and it is an object of the present disclosure to make it easy, when a plurality of users travel by sharing the same vehicle, to obtain the fellow passengers' agreement on the route change.

SUMMARY

One aspect of the present disclosure is an information processing apparatus comprising:
  a communicator configured to receive request data which is a request relating to a change in a traveling route of a vehicle from a first user among two or more users traveling in the vehicle; and
  a processor configured to execute:
  determining one or more incentives to be granted to one or more second users among the two or more users accompanying the change in the traveling route, wherein the one or more second users are a part of or all of the two or more users excluding the first user;
  presenting incentive information on the one or more determined incentives and one or more inquiries about whether or not to accept the change in the traveling route to the one or more second users; and
  creating granting data for granting the one or more determined incentives to the one or more second users when the one or more second users accept the change in the traveling route.

Another aspect of the present disclosure is an information processing method including:
  receiving request data which is a request relating to a change in a traveling route of a vehicle from a first user among two or more users traveling in the vehicle;
  determining one or more incentives to be granted to one or more second users among the two or more users accompanying the change in the traveling route, wherein the one or more second users are a part of or all of the two or more users excluding the first user;
  presenting incentive information on the one or more determined incentives and one or more inquiries about whether or not to accept the change in the traveling route to the one or more second users; and
  creating granting data for granting the one or more determined incentives to the one or more second users when the one or more second users accept the change in the traveling route.

Another aspect of the present disclosure is an information processing system comprising:
  a communicator configured to receive a request relating to a change in a traveling route of a vehicle from a first user among two or more users traveling in the vehicle; and
  a processor configured to execute:
  determining one or more incentives to be granted to the one or more second users among the two or more users accompanying the change in the traveling route, wherein the one or more second users are a part of or all of the two or more users excluding the first user;
  presenting incentive information on the one or more determined incentives and one or more inquiries about whether or not to accept the change in the traveling route to the one or more second users; and
  creating granting data for granting the one or more determined incentives to the one or more second users when the one or more second users accept the change in the traveling route.

According to the present disclosure, when a plurality of users travel by sharing the same vehicle, it is possible to make it easy to obtain fellow passengers' agreement on a route change.

DESCRIPTION OF THE EMBODIMENTS

Hereinafter, more specific embodiments of the present disclosure will be described based on the accompanying drawings. A hardware configuration, a module configuration, a functional configuration or the like described in the respective embodiments is not intended to limit the technical scope of the disclosure thereto unless specified otherwise.

One aspect of the present disclosure is an information processing apparatus including a communicator that receives request data which is a request relating to a change in a traveling route of a vehicle from a first user among two or more users traveling in the same vehicle and a processor that executes: determining one or more incentives to be granted to one or more second users among the two or more users accompanying the change in the traveling route, wherein the one or more second users are a part of or all of the two or more users excluding the first user; presenting incentive information on the one or more determined incentives and one or more inquiries about whether or not to accept the change in the traveling route to the one or more second users; and creating, when the change in the traveling route is accepted by the one or more second users, granting data for granting the determined incentives to the one or more second users.

The vehicle may be a vehicle that travels by being driven by a driver or a vehicle that autonomously travels. In the case of the vehicle that travels by being driven by the driver, the driver may be included in the one or more second users among the two or more users. Examples of the incentive include points usable for a predetermined service, money, a ticket or a coupon. Examples of the presentation include transmission to and display on a user terminal possessed by each user or display on an in-vehicle display.

Incentive information granted accompanying a change in the traveling route is presented to the one or more second users in the same vehicle, which makes it easy to obtain agreement of the one or more second users about the route change.

According to one aspect of the present disclosure, in the determining, the one or more incentives to be granted to the one or more second users may be determined within a range of the incentive presented by the first user. This makes it possible to prevent route changes from being requested indiscriminately.

According to another aspect of the present disclosure, the processor may further execute calculating one or more delay times of arrival at the one or more destinations of the one or more second users accompanying a change in the traveling route and determining one or more incentives to be granted to the one or more second users according to the one or more delay times of arrival at the one or more destinations of the one or more second users. It is thereby possible to eliminate the feeling of unfairness among the one or more second users sharing the same vehicle and thereby make it easier to obtain agreement on the route change.

According to a further aspect of the present disclosure, the processor may further execute calculating one or more delay times of arrival at the one or more destinations of the one or more second users accompanying the change in the traveling route and further presenting one or more delay times of arrival at the one or more destinations of the one or more second users. It is thereby possible for the one or more second users in the same vehicle to grasp one or more delay times of arrival at the one or more destinations by the route change and determine whether or not to permit the route change based thereon.

First Embodiment

Figure 1:
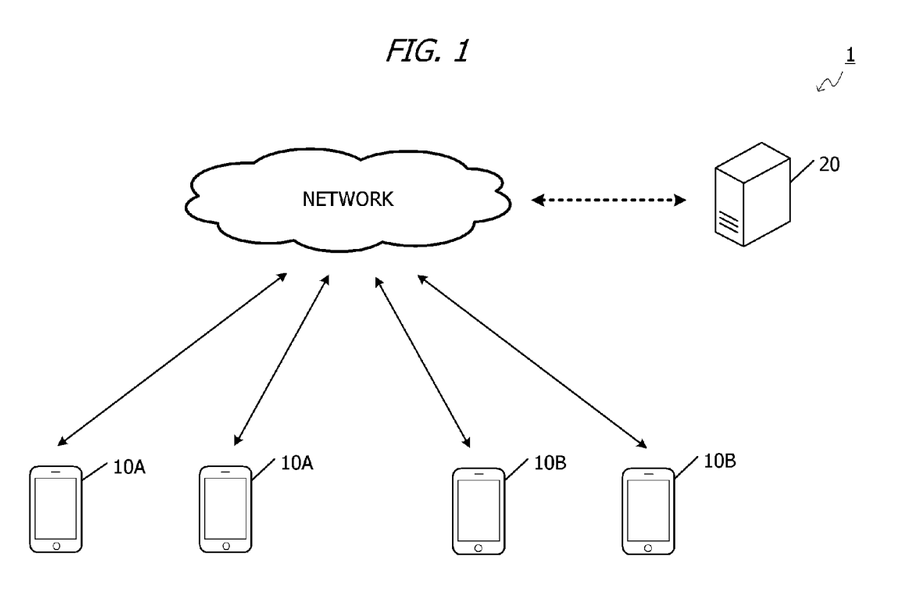
FIG. 1 is a diagram illustrating an example of a system configuration of a ride sharing service providing system according to a first embodiment.

FIG. 1 is a diagram illustrating an example of a system configuration of a ride sharing service providing system 1 according to a first embodiment. The ride sharing service providing system 1 includes user terminals 10 carried by users and a management server 20. Hereinafter, a user who wants a ride in a vehicle will be referred to as a "riding user" and a user who drives the vehicle will be referred to as a "driving user." The management server 20 is an example of an "information processing apparatus."

The user terminal 10 is constructed to be switchable between a mode available to a riding user (hereinafter referred to as a "riding user mode") and a mode available to a driving user (hereinafter referred to as a "driver mode"). Hereinafter, the user terminal 10 operating in the riding user mode will be referred to as a "user terminal 10A." On the other hand, the user terminal operating in the driver mode will be referred to as a "user terminal 10B." When no distinction is made between the user terminal 10A and the user terminal 10B, the user terminal is simply referred to as a "user terminal 10." Details of operation in each mode will be described later.

The riding user registers a riding reservation request and the user's own traveling-related information in the management server 20 via the user terminal 10A. The "user's own traveling-related information" refers to, for example, a place of departure and destination of the riding user, a date and time at which the riding user wants to start traveling or the like. On the other hand, the driving user registers the user's own traveling-related information in the management server 20 via the user terminal 10B. The "traveling-related information" of the driving user namely refers to traveling-related information on the vehicle driven by the driving user. The traveling-related information of the driving user is, for example, a date and time at which driving of the vehicle starts and a traveling route. The traveling-related information of the riding user and the traveling-related information of the driving user will be referred to as a "traveling schedule" hereinafter.

These information pieces can be generated and registered by, for example, application software for using a ride sharing service installed in the user terminal 10. However, these information pieces need not always be registered using the user terminal 10. For example, the information may be registered using an arbitrary terminal connectable to a network (a smartphone, a mobile phone, a tablet terminal, a personal information terminal, a wearable computer or the like) or a personal computer.

The management server 20 is an apparatus that manages a traveling schedule registered by the user terminal 10 and matches between the users according to a riding reservation request from the user terminal 10A of the riding user. "Matching" means associating a driving user with a riding user based on a traveling schedule. Note that when the vehicle is provided by a third party, the "matching" includes associating a driving user, a riding user and a vehicle with one another based on a traveling schedule. The management server 20 matches between the users based on the registered traveling schedule and determines a traveling route of the vehicle driven by the driving user, a place at which the riding user is allowed to get in the vehicle, and a place at which the riding user is allowed to get out of the vehicle or the like.

When the matching is completed, the management server 20 transmits riding reservation information to the user terminal 10A and the user terminal 10B. The riding reservation information includes, for example, a driving user ID, a riding user ID, a scheduled joining place where the riding user joins the vehicle, a scheduled joining time, a traveling route, a destination of the riding user, a scheduled arrival time, presence or absence of other fellow passengers. Together with the riding reservation information, for example, information on the vehicle driven by the driving user and information on the riding user and the driving user are also transmitted. The information on the vehicle includes, for example, information on a vehicle type, color and number plate. The information on the riding user and the driving user includes, for example, sex and age. When each user (driving user or riding user) who has received the riding reservation information approves the riding reservation, the matching between the riding user and the driving user is thereby confirmed and the riding reservation is established. It is thereby possible for the driving user and the riding user to join and travel together.

In the ride sharing service providing system 1 according to the first embodiment, the user terminal 10A, the user terminal 10B and the management server 20 are mutually connected via a network. For example, a WAN (Wide Area Network) which is a worldwide scale public communication network such as the Internet and other communication networks may be adopted as the network. Furthermore, the network may include a telephone communication network such as a mobile phone and a wireless communication network such as Wi-Fi (registered trademark).

In the first embodiment, for example, after a riding reservation is established by the ride sharing service providing system 1, when the riding user wants to change any one of a destination, a passing spot, a departure time, an arrival time, getting-in order and getting-off order, the riding user performs operation of requesting the user terminal 10A for a route change. The riding user determines an incentive that can be provided to other users in the same vehicle (including the driving user as well) and inputs provided incentive information on the determined incentive to the user terminal 10A. The user terminal 10A of the riding user transmits a message of the route change request and the provided incentive information to the management server 20. The message of the route change request is an example of "request data which is a request relating to a change in the traveling route of the vehicle." Hereinafter, the message of the route change request will be simply referred to as a "route change request."

Upon receiving the route change request from the user terminal 10A, the management server 20 calculates a new route after changing the item desired by the riding user and calculates, for example, delay times of arrival at the destinations of each of the other riding users from the route before change. The management server 20 determines incentives to be granted to the other users sharing the same vehicle with the riding user together with the route change request and within a range of the provided incentive information received from the user terminal 10A. The management server 20 transmits delay times of arrival at the destinations due to the route change, information on the granted incentives and an inquiry about whether or not a route change is possible to the respective user terminals 10 of the other users.

Upon receiving permission responses to the route change from the user terminals 10 of all the other users in the same vehicle, for example, the management server 20 notifies the user terminal 10A of the riding user who is the request source of the route change of the confirmation on the route change. The management server 20 also notifies the other users in the same vehicle of the route change. The driving user drives the vehicle according to the notification of the route change.

The management server 20 stores incentive information possessed by each user, creates granting data for granting incentives to the other ride sharing users, creates collection data to collect incentives from the user requesting the route change and updates the incentive information of each user from the data. The incentive may be, for example, points usable for a ride sharing service or a predetermined purpose, a ticket, a coupon or money. When the incentive is money, the money is paid not in cash, but by credit card or by withdrawal from a bank account, registered in advance, for example. Furthermore, when the incentive is money, the sum of money to be granted for the route change may be deducted from the sum of money to be paid by the other ride sharing users, for example.

It is more likely to obtain agreement on the route change by presenting to the other ride sharing users that incentives are granted about the route change. Note that a request for a route change can be made not just by the riding users but also by the driving user. Furthermore, a request for a route change can be made before riding in the vehicle or during ride after the riding reservation is established.

Figure 2:
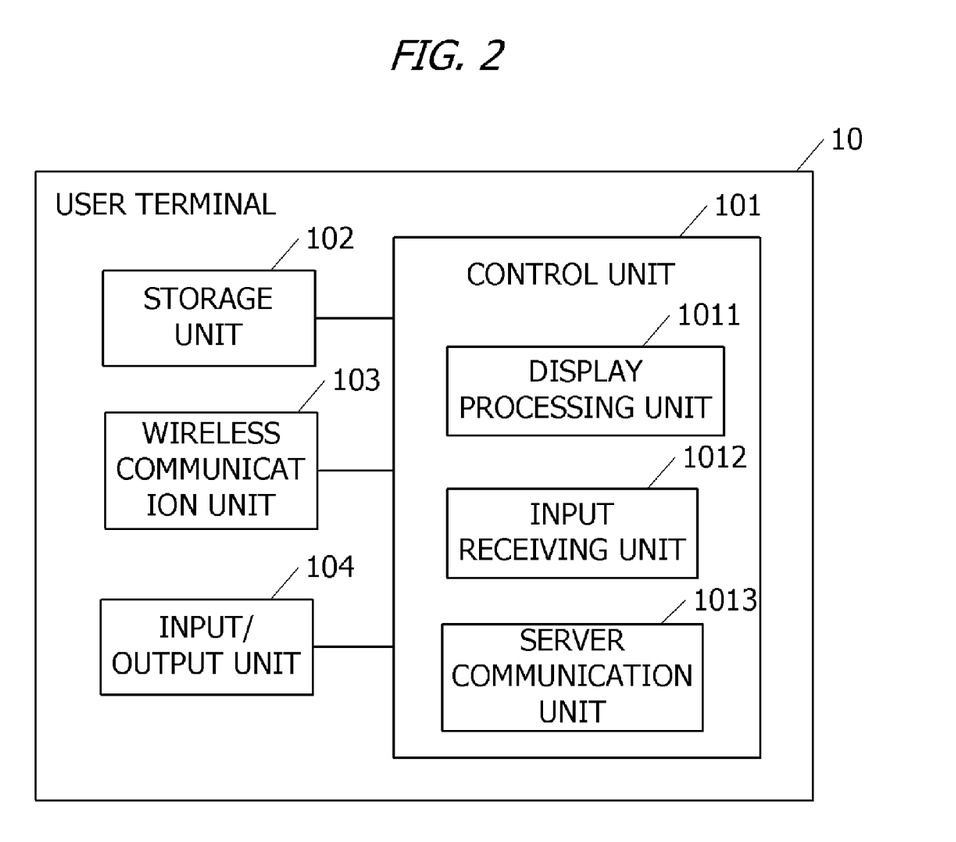
FIG. 2 is a diagram illustrating an example of a system configuration of the user terminal.

FIG. 2 is a diagram illustrating an example of a system configuration of the user terminal 10. The user terminal 10 is a small computer such as a smartphone, a mobile phone terminal, a tablet computer, a personal information terminal, a notebook computer or a wearable computer (a smart watch or the like). Note that the user terminal 10 may be possessed by each user or may be provided for the vehicle. The user terminal 10 includes, for example, a control unit 101, a storage unit 102, a wireless communication unit 103 and an input/output unit 104 as hardware components.

The control unit 101 is an operation apparatus that manages control exercised by the user terminal 10. The control unit 101 can be implemented, for example, using an operation processing apparatus such as a CPU (Central Processing Unit). The control unit 101 is provided with, for example, a display processing unit 1011, an input receiving unit 1012 and a server communication unit 1013 as functional components. Each functional component is implemented, for example, by the control unit 101 executing a program stored in the storage unit 102, which will be described later.

The display processing unit 1011 executes processing of causing the input/output unit 104, which will be described later, to display a predetermined screen, for example. For example, in the first embodiment, the display processing unit 1011 causes a route change request setting screen or a route change possibility inquiry screen which will be described later to be displayed on a screen of the input/output unit 104. The route change request setting screen is a screen from which a route change due to a destination change or the like is set and an instruction for transmitting the request is inputted, for example. The route change possibility inquiry screen is a screen from which a response on whether or not to permit a route change request transmitted, for example, by one other ride sharing user, is inputted.

The input receiving unit 1012 receives a user operation corresponding to the screen under display inputted from, for example, the input/output unit 104, which will be described later. More specifically, the input receiving unit 1012 receives an input operation of a route change request on the route change request setting screen or an input operation of a response to the route change request on the route change possibility inquiry screen inputted to the input/output unit 104, generates a route change request or a response to the route change request from contents of the operation and outputs the route change request or the response to the server communication unit 1013.

The server communication unit 1013 is an interface with the management server 20. Upon receiving, for example, inputs of the riding reservation request, the route change request or the response to the route change request from the input receiving unit 1012, the server communication unit 1013 transmits the request or response to the management server 20 via the wireless communication unit 103. Upon receiving the riding reservation information from the management server 20, the server communication unit 1013 saves the riding reservation information in the storage unit 102. Furthermore, the server communication unit 1013 receives, for example, a route change confirmation request from the management server 20 and outputs the route change confirmation request to the display processing unit 1011. After receiving an input of the route change confirmation request from the server communication unit 1013, the display processing unit 1011 outputs a route change possibility inquiry screen which will be described later to the input/output unit 104.

The storage unit 102 includes, for example, a main memory and an auxiliary storage device. The main memory is a memory in which a program executed by the control unit 101 and data used by the control program are developed. The auxiliary storage unit is an apparatus that stores a program executed by the control unit 101 and data used by the control program. The auxiliary storage device may also store a program which is executed by the control unit 101 and packaged as an application. The auxiliary storage device may also store the operating system for executing the applications. The program stored in the auxiliary storage device is loaded into the main memory and executed by the control unit 101 to thereby perform processing of the above-described functional components.

The main memory may include a RAM (Random Access Memory) and a ROM (Read Only Memory). The auxiliary storage device may include an EPROM (Erasable Programmable ROM) and a hard disk drive (HDD). Furthermore, the auxiliary storage device may also include a removable medium, that is, a removable recording medium. The removable medium is a USB (Universal Serial Bus) memory or a disk recording medium such as a CD (Compact Disc) or a DVD (Digital Versatile Disc).

The wireless communication unit 103 is a wireless communication interface for connecting the user terminal 10 to a network. The wireless communication unit 103 provides access to the network via a mobile communication service such as a wireless LAN, 3G, LTE or 5G.

The input/output unit 104 receives an input operation executed by a user and provides information to the user. In the first embodiment, the input/output unit 104 is a touch panel display. That is, in the first embodiment, the input/output unit 104 includes, for example, a liquid crystal display and control means therefor and a touch panel and control means therefor.

Note that the configuration illustrated in FIG. 2 is an example and all or some of the illustrated functions may be executed using a specially designed circuit. A program thereof may be stored or executed by a combination of a main memory and an auxiliary storage device other than those illustrated.

Figure 3:
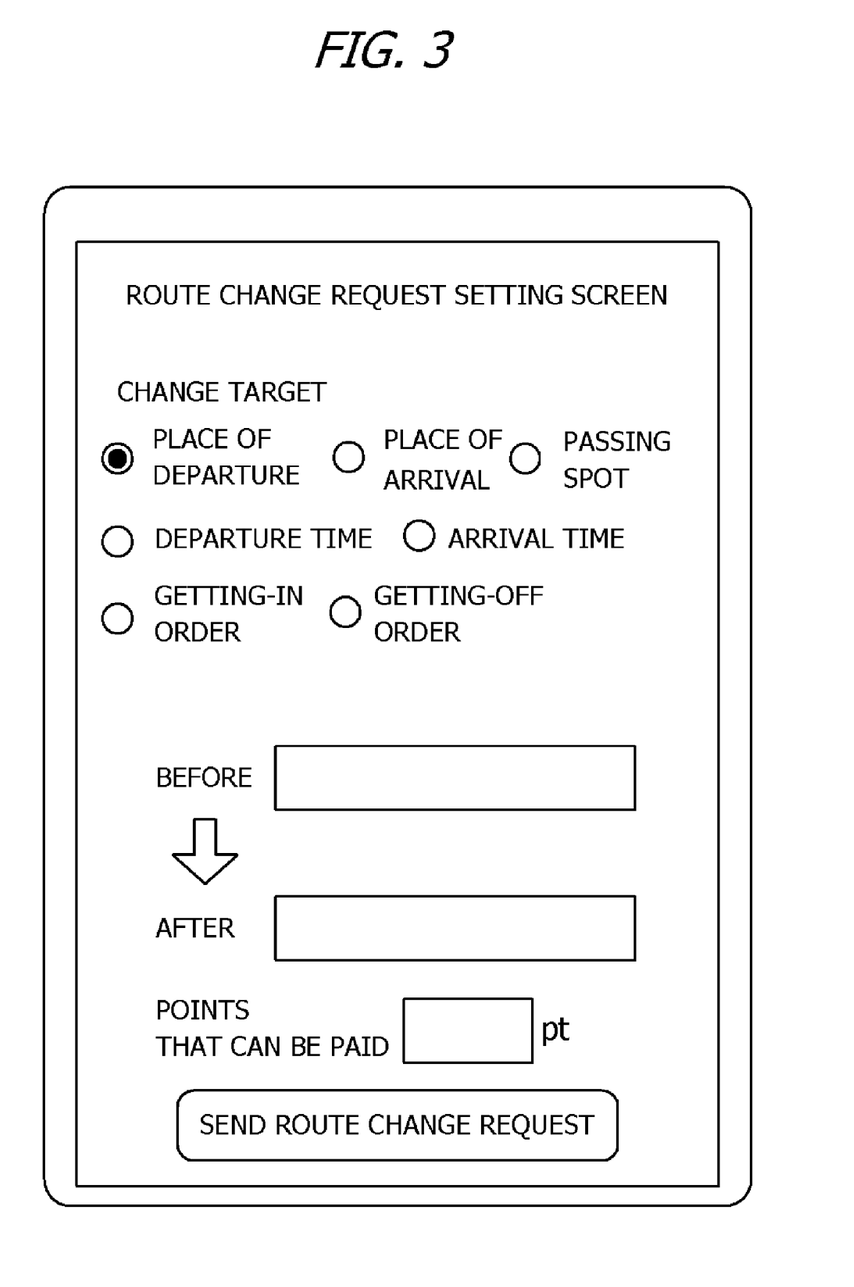
FIG. 3 is a diagram illustrating an example of a route change request setting screen of the user terminal.

FIG. 3 is a diagram illustrating an example of a route change request setting screen of the user terminal 10. The route change request setting screen is, for example, a screen for the user whose ride sharing service riding reservation has already been established to set a request for a route change accompanying a change of a destination or the like. The route change request setting screen is displayed, for example, when a riding reservation confirmation menu is selected from a menu screen of application software to use a ride sharing service of the user terminal 10 and the corresponding riding reservation information is selected from the riding reservation information displayed on a riding reservation confirmation screen.

The route change request setting screen illustrated in FIG. 3 includes alternatives for a change target, a field for inputting information before and after change, a field for inputting points that can be provided and a button for instructing transmission of a route change request. A place of departure, a destination, a passing spot, a departure time, an arrival time, getting-in order and getting-off order are illustrated as the alternatives for a change target. For example, when the change target is selected, information before change corresponding to the selected change target is automatically inputted in the input field of information before change. The input field of information after change is changed to an input form corresponding to, for example, the selected change target.

For example, when the change target is a place of departure, a destination or a passing spot, a history of past inputs may be displayed below the input field of the information after change and the selected history may be inputted into the input field of the information after change or a candidate point including an inputted character string may be displayed below the input field in a free input format. For example, when the change target is a departure time or an arrival time, the input field of the information after change may be a display in a pull-down menu format which is selectable in hours and minutes, respectively. For example, when the change target is getting-in order or getting-off order, the input field after change may be a display in a pull-down menu format in which getting-in order or getting-off order is selectable.

FIG. 3 illustrates a route change request setting screen when an incentive to be granted to the other users accompanying the route change is estimated to be predetermined points. Therefore, an input field of points that can be provided is set on the route change request setting screen illustrated in FIG. 3. When the incentive to be granted to the other users accompanying the route change is a coupon, a pull-down menu of coupons that can be provided by the user who makes a route change request is displayed on the route change request setting screen, for example, as an incentive that can be provided.

When the route change request send button is selected, the route change request is inputted to the input receiving unit 1012 of the user terminal 10. The input receiving unit 1012 generates a route change request including information before change and after change of the change target inputted to the route change request setting screen and transmits the route change request to the management server 20 via the server communication unit 1013. Together with the route change request, for example, the user ID of the user of the user terminal 10 and the identification information of the riding reservation are also transmitted to the management server 20. Note that the route change request setting screen illustrated in FIG. 3 is an example and the route change request setting screen is not limited to this.

Figure 4:
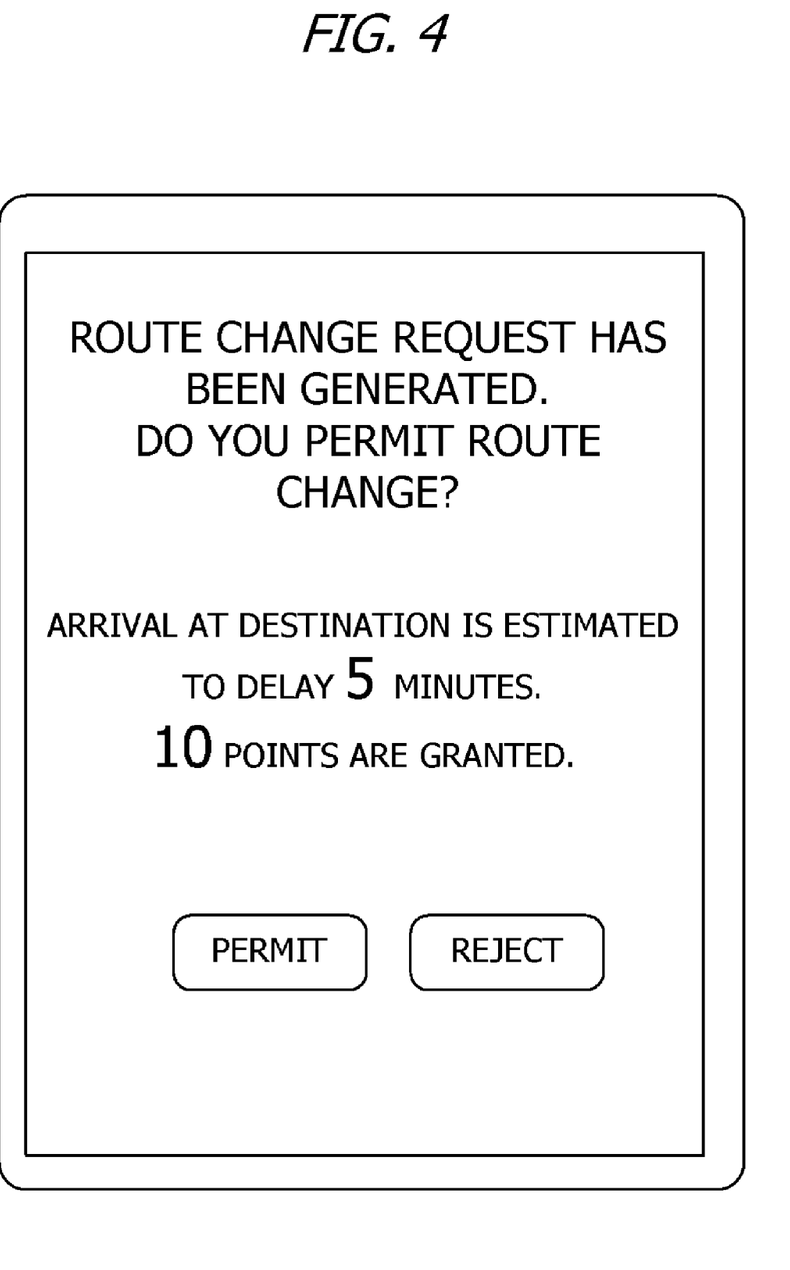
FIG. 4 is an example of a route change possibility inquiry screen of the user terminal.

FIG. 4 is an example of a route change possibility inquiry screen of the user terminal 10. The route change possibility inquiry screen is a screen for inquiring, when any other fellow user transmits a route change request, whether or not to permit the route change. The route change possibility inquiry screen is displayed by the display processing unit 1011, for example, when the route change confirmation request is received from the management server 20.

The route change possibility inquiry screen includes, for example, a message notifying that a route change request is generated from one other ride sharing user, a delay time of arrival at the destination of the user who has received the route change confirmation request, information on an incentive to be granted when the route change is permitted, a permit button and a reject button. The delay time of arrival at the destination of the user who has received the route change confirmation request and the information on the incentive to be granted when the route change is permitted are received, for example, together with the route change confirmation request from the management server 20.

When the permit button is selected, the input receiving unit 1012 receives an input of a permission response, generates a permission response and the permission response is transmitted to the management server 20 via the server communication unit 1013. When the reject button is selected, the input receiving unit 1012 receives an input of a reject response, generates a reject response and the reject response is transmitted to the management server 20 via the server communication unit 1013. Note that the route change possibility inquiry screen illustrated in FIG. 4 is an example and the route change possibility inquiry screen is not limited to this.

Figure 5:
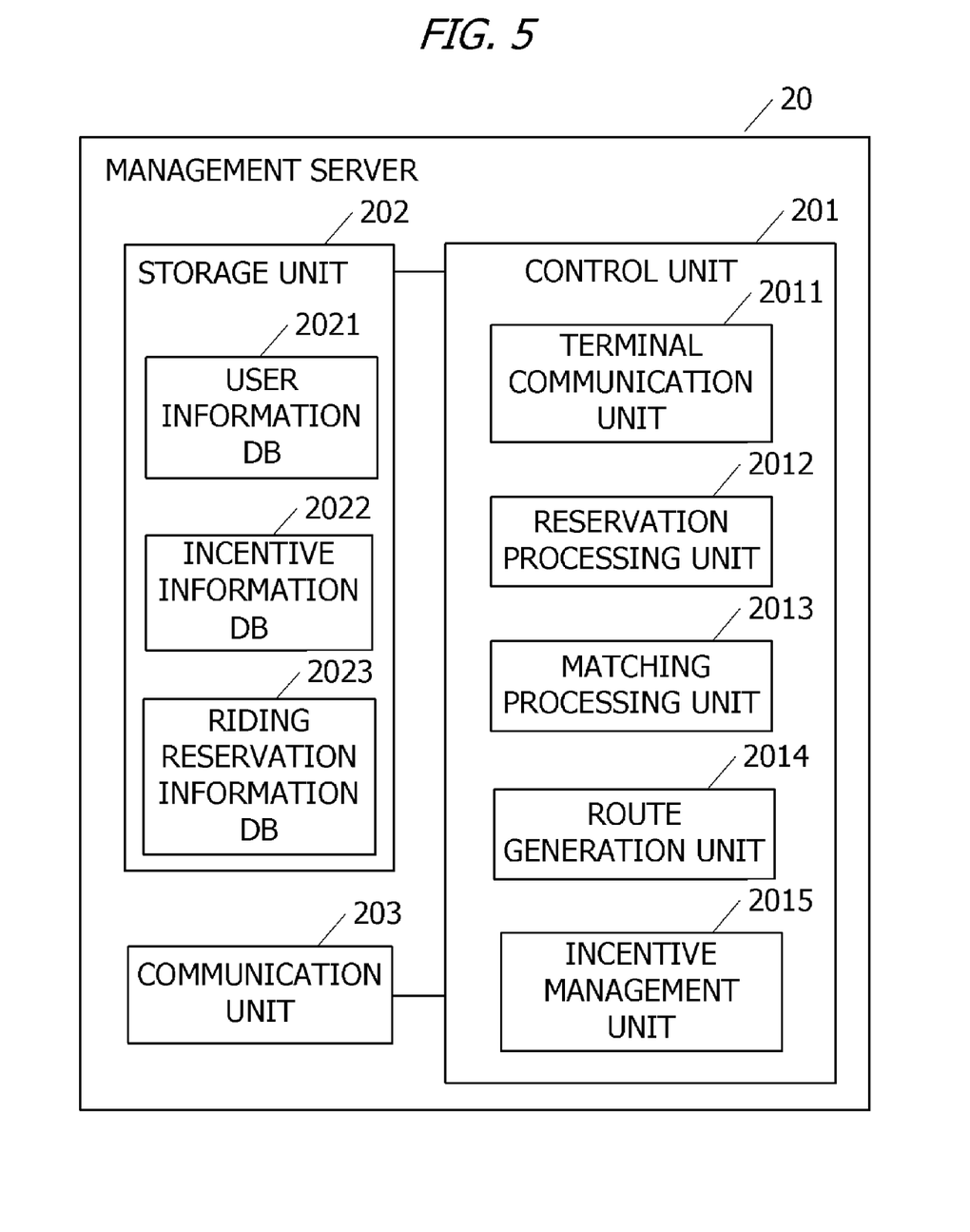
FIG. 5 is a diagram illustrating an example of a system configuration of the management server.

FIG. 5 is a diagram illustrating an example of a system configuration of the management server 20. The management server 20 is constructed of a general computer. That is, the management server 20 is a computer including a processor such as a CPU or a GPU, a main memory such as a RAM or a ROM, and an auxiliary storage device such as an EPROM, a hard disk drive or a removable medium. Note that the removable medium may be a USB memory or a disk recording medium such as a CD or a DVD, for example. It is possible to implement the respective functions that match a predetermined purpose as will be described later by storing an operating system (OS), various programs, various tables or the like in the auxiliary storage device, loading the program stored therein into a work area of the main memory, executing the program and controlling the respective components or the like through execution of the program. However, some or all of the functions may be implemented by a hardware circuit such as an ASIC or an FPGA. Note that the management server 20 may be constructed of a single computer or constructed of a plurality of computers cooperating with one another.

The management server 20 includes a control unit 201, a storage unit 202 and a communication unit 203. The communication unit 203 is a communication interface for connecting the management server 20 to a network. The communication unit 203 is constructed by including, for example, a network interface board or a wireless communication circuit for wireless communication. The communication unit 203 is an example of the "communicator."

The storage unit 202 is constructed by including a main memory and an auxiliary storage device. The main memory is a memory in which a program executed by the control unit 201 and data used by the control program are developed. The auxiliary storage device is an apparatus that stores the program executed by the control unit 201 and data used by the control program. The main memory and the auxiliary storage device are similar to the storage unit 102, and so detailed description will be omitted.

The storage unit 202 includes a user information database (DB) 2021, an incentive information DB 2022 and a riding reservation information DB 2023. The user information DB 2021, the incentive information DB 2022 and the riding reservation information DB 2023 are constructed, for example, by a program of a database management system (DBMS) executed by the control unit 201 managing data stored in the storage unit 202. The user information DB 2021, the incentive information DB 2022 and the riding reservation information DB 2023 are, for example, relational databases.

The user information DB 2021 is a database storing user information acquired from the user terminal 10. The user information includes, for example, information indicating whether the user is the riding user or the driving user, user identification information, a traveling schedule, information on the user (sex, age or the like).

The incentive information DB 2022 includes, for example, information on an incentive possessed by each user, information on incentives that can be provided to other users sharing the same vehicle when each user requests a route change. Details of the information stored in the incentive information DB 2022 will be described later.

The riding reservation information DB 2023 includes, for example, riding reservation information, matching of which is confirmed. Details of the information stored in the riding reservation information DB 2023 will be described later.

The control unit 201 is an operation apparatus that manages control exercised by the management server 20. The control unit 201 is an operation processing apparatus such as a CPU. The control unit 201 is provided with a terminal communication unit 2011, a reservation processing unit 2012, a matching processing unit 2013, a route generation unit 2014 and an incentive management unit 2015 as functional components. These functional components are implemented, for example, by the control unit 201 executing a program stored in the storage unit 202. The control unit 201 is an example of the "processor."

The terminal communication unit 2011 is an interface with the user terminal 10. Examples of data received by the terminal communication unit 2011 include user information, a traveling schedule, a route change request, and a response to a route change confirmation request from the user terminal 10. Examples of data transmitted from the terminal communication unit 2011 include a route change confirmation request, a route change confirmation notification, a route change impossibility notification and a route change notification to the user terminal 10. The route change confirmation notification and the route change impossibility notification are transmitted to the user terminal 10 of the route change request source when the route change is confirmed or the route change is rejected according to the route change request. The route change notification is transmitted to the user terminals 10 of all the users riding in the vehicle where the route change request has arisen.

The reservation processing unit 2012 performs control relating to riding reservation. More specifically, the reservation processing unit 2012 receives a riding reservation request from the user terminal 10A via the terminal communication unit 2011. The reservation processing unit 2012 receives, for example, the traveling schedule (a place of departure, a destination, a desired date and time to start traveling and the like) together with the riding reservation request from the user terminal 10A.

Upon receiving the riding reservation request from the user terminal 10A, the reservation processing unit 2012 requests matching from the matching processing unit 2013. The reservation processing unit 2012 receives, for example, information on the driving user matched with the riding user of the user terminal 10A from the matching processing unit 2013. The reservation processing unit 2012 transmits the riding reservation request to the user terminal 10B of the driving user matched with the riding user of the user terminal 10A via the terminal communication unit 2011. The riding reservation information is transmitted together with the riding reservation request. The riding reservation information includes, for example, a scheduled joining point and a scheduled joining time, a place of departure and a destination of the riding user and a desired arrival time. Together with the riding reservation information, for example, information on the riding user including a user ID and attributes or the like of the riding user acquired from the user information DB 2021 are also transmitted.

Upon receiving an OK response to the riding reservation request from the user terminal 10B via the terminal communication unit 2011, the reservation processing unit 2012 determines the establishment of the riding reservation and notifies the user terminal 10A of the riding user of the establishment of the riding reservation. Together with the notification of the establishment of the riding reservation, for example, the riding reservation information and the information on the driving user are also transmitted. The information on the driving user also includes a driving user ID and attributes, information on the vehicle or the like acquired from the user information DB 2021.

When, for example, the riding reservation is established, the reservation processing unit 2012 requests that the route generation unit 2014 generate a route corresponding to the riding reservation. Upon receiving an input of the route information corresponding to the riding reservation from the route generation unit 2014, the reservation processing unit 2012 stores the route information in association with the riding reservation in the riding reservation information DB 2023. The route information includes, for example, a route, a scheduled time of arrival at the destination. Note that when there are other users riding in the same vehicle, scheduled joining points and routes including destinations of the other riding users are generated. When there are other users riding in the same vehicle, the route information may also include getting-in order and getting-off order of the corresponding riding users.

Upon receiving the route change request from the user terminal 10 of the user whose riding reservation is established, for example, the reservation processing unit 2012 requests that the route generation unit 2014 generate a route after changing the change target included in the route change request and acquires route information after change from the route generation unit 2014. The reservation processing unit 2012 compares the route information after change with, for example, the route information before change stored in the riding reservation information DB 2023 and acquires differences (delay times) in scheduled times of arrival at destinations of the respective riding users. Regarding the driving user, for example, a difference in a time of arrival at the destination of the last user who gets off the vehicle is assumed to be the delay time.

The reservation processing unit 2012 determines an incentive to be granted for each ride sharing user, for example, within a range of provided incentive information received together with the route change request according to the calculated delay time. The incentive to be granted to each ride sharing user is determined, for example, such that the longer the delay time is, the higher the value of the incentive becomes. The ride sharing users include the driving user as well.

The reservation processing unit 2012 transmits a route change confirmation request to the user terminal 10 of each user sharing the same vehicle with the request source user of the route change via the terminal communication unit 2011. Together with the route change confirmation request, information on an incentive to be granted to each user and a delay time of arrival at a destination of each user are transmitted.

The reservation processing unit 2012 receives a response to the route change confirmation request from each user. For example, when responses from all the users sharing the vehicle with the route change request source user are permission responses, the reservation processing unit 2012 confirms the route change and notifies the user terminal 10 of the route change request source of the confirmation of the route change. When responses from some ride sharing users are reject responses, the reservation processing unit 2012 suspends the route change and notifies the user terminal 10 of the route change request source of impossibility of the route change.

When the route change is confirmed, the reservation processing unit 2012 creates granting data for granting an incentive to the other users sharing the same vehicle with the route change request source user and outputs the granting data to the incentive management unit 2015. More specifically, for example, when the incentive is predetermined points, the reservation processing unit 2012 creates granting data including points to be added to possessed points of each user. In this case, the incentive management unit 2015 adds the notified points to possessed points of the corresponding user in the incentive information DB 2022 based on the inputted granting data. Furthermore, the reservation processing unit 2012 creates collection data including points provided from the route change request source user and outputs the collection data to the incentive management unit 2015. The incentive management unit 2015 subtracts the notified points from the possessed points of the request source user in the incentive information DB 2022 based on the inputted collection data.

Next, in response to a request from the reservation processing unit 2012, the matching processing unit 2013 performs matching between the riding user corresponding to the user terminal 10A which is the source of the riding reservation request and the driving user. The matching method of the matching processing unit 2013 may be any one of well-known techniques and is not limited to a specific method. For example, the matching processing unit 2013 extracts the driving user whose traveling schedule overlaps with that of the riding reservation request source riding user from a user information DB 2031. That the "traveling schedule overlaps" means, for example, that according to the traveling schedules of the riding user and the driving user, traveling periods (from a departure time to an arrival time) overlap and directions of the place of departure or/and the destination are the same. The matching processing unit 2013 selects a matching partner of the riding reservation request source riding user from among the extracted driving users, for example, randomly or based on evaluation values or attributes or the like.

The matching processing unit 2013 determines a scheduled joining point based on, for example, the place of departure and destination of the riding user and the traveling route of the driving user. The matching processing unit 2013 determines the scheduled joining time based on the date and time at which the riding user wants to start traveling and the date and time at which the driving user starts driving the vehicle. The method for determining the scheduled joining point and the scheduled joining time may be any one of well-known techniques and is not limited to a specific method. The matching processing unit 2013 outputs information on the selected driving user, the scheduled joining point, the scheduled joining time or the like to the reservation processing unit 2012.

The route generation unit 2014 generates a route according to a request from the reservation processing unit 2012. For example, the route generation unit 2014 receives inputs of traveling schedules of a riding user and the driving user whose riding reservation has been established from the reservation processing unit 2012 and generates a route from the place of departure of the driving user through the place of departure of the riding user, the destination of the riding user to the destination of the driving user in that order. When there are a plurality of riding users riding in the corresponding vehicle, routes through the places of departure and destinations of the respective users are generated between the place of departure and the destination of the driving user. Any one of known techniques may be used as the method of generating the routes. The route generation unit 2014 outputs route information including a scheduled time of arrival at a place of departure and destination of each user, getting-in order, getting-off order and a route between respective passing spots (place of departure and destination of each user) to the reservation processing unit 2012.

The incentive management unit 2015 manages the incentive information DB 2022. The incentive management unit 2015 updates the incentive information DB 2022, for example, according to the notification from the reservation processing unit 2012.

Note that any one of the functional components of the management server 20 or some of processes thereof may be executed by another computer connected to the network N1. For example, processes of the terminal communication unit 2011, the reservation processing unit 2012, the matching processing unit 2013, the route generation unit 2014 and the incentive management unit 2015 may be executed by different computers.

Figure 6:
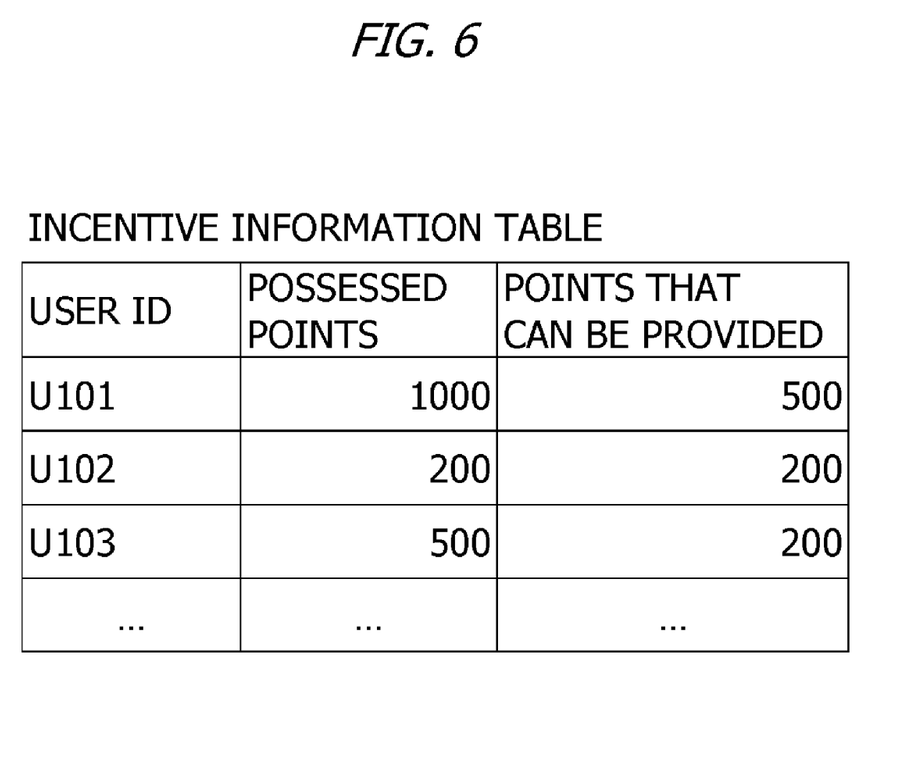
FIG. 6 is an example of an incentive information table.

FIG. 6 is an example of an incentive information table. The incentive information table is a table stored in the incentive information DB 2022. The incentive information table is a table that stores information on incentives possessed by the respective users. FIG. 6 illustrates an example of the incentive information table in the case where predetermined points are used as an incentive.

The incentive information table illustrated in FIG. 6 includes fields of a user ID, possessed points and points that can be provided. The user ID field is filled in with the user's identification information. The possessed point field is filled in with the number of points possessed by the user. The field of points that can be provided is filled in with the number of points which is set in advance by the user and which is the number of points that can be provided when a route change is requested. The number of points that can be provided when a route change is requested can be set arbitrarily. Note that it is not possible to set the number of points that can be provided beyond the number of possessed points.

For example, when the number of points that can be provided when a route change is requested is set in advance, the user need not input the number of points in the input field of points that can be provided on the route change request setting screen. In this case, the reservation processing unit 2012 acquires the number of points that can be provided of the user from the incentive information table and determines incentives to be granted to the other ride sharing users.

When the reservation processing unit 2012 receives no provided incentive information from the user terminal 10 in reception of the route change request and there is no setting of the number of points that can be provided of the request source user in the incentive information table, the reservation processing unit 2012 transmits a request for the provided incentive information to the user terminal 10.

When the route change is confirmed, the incentive management unit 2015 updates the number of possessed points of the request source user with the number of points that can be provided being deducted from the number of possessed points. The incentive management unit 2015 updates the number of possessed points of the other users who share the vehicle with the request source user with the number of possessed points of each user being added thereto. Note that the incentive information table illustrated in FIG. 6 is an example, and the incentive information table is not limited to this.

Figure 7:
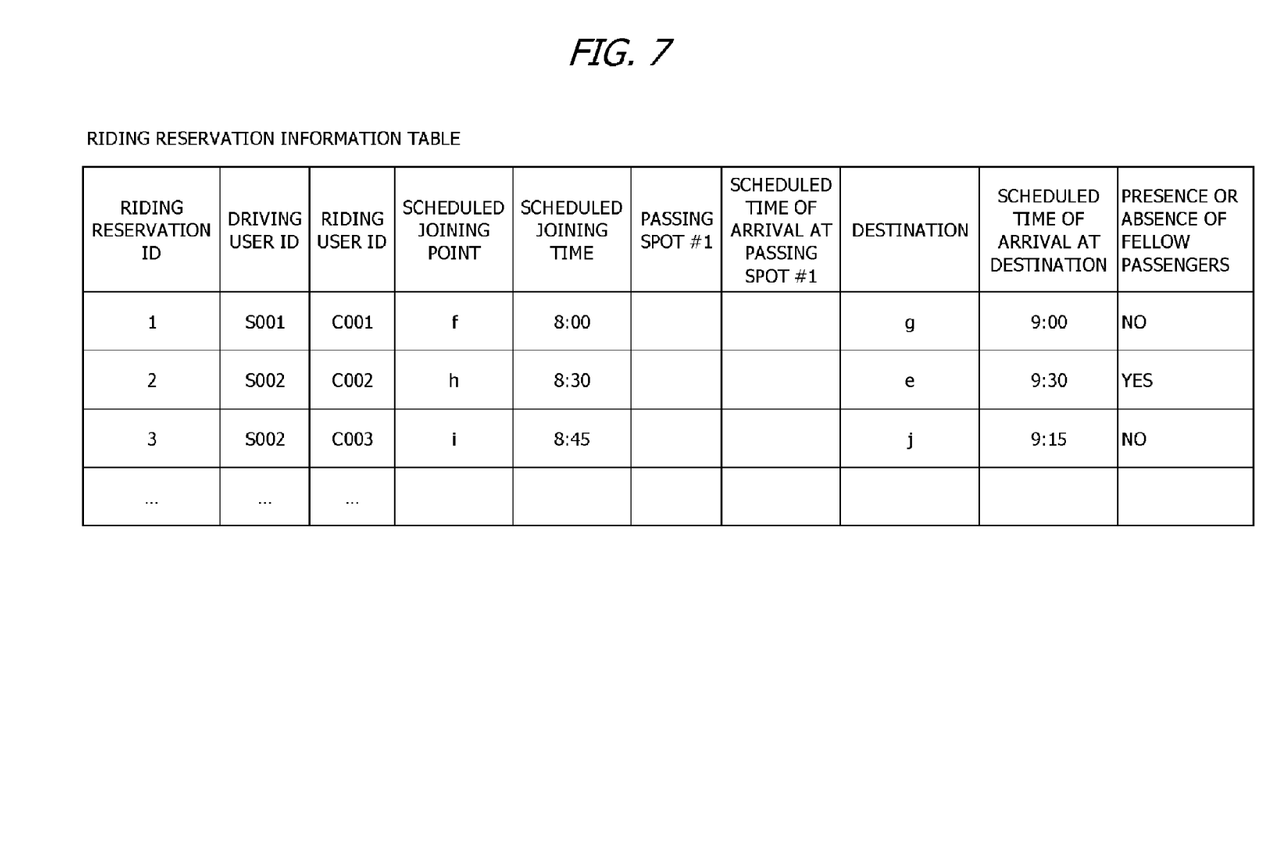
FIG. 7 is an example of a riding reservation information table.

FIG. 7 is an example of a riding reservation information table. The riding reservation information table is stored in the riding reservation information DB 2023. The riding reservation information table stores riding reservation information. The riding reservation information table is a table that stores information on riding reservations.

The riding reservation information table illustrated in FIG. 7 includes fields of a riding reservation ID, a driving user ID, a riding user ID, a scheduled joining point, a scheduled joining time, a passing spot, scheduled time of arrival at the passing spot, a destination, scheduled time of arrival at the destination, and the presence or absence of fellow passengers. The riding reservation ID field is filled in with identification information on a riding reservation.

The driving user ID field is filled in with a user ID of a driving user. The riding user ID field is filled in with a user ID of a riding user.

The scheduled joining point field is filled in with information on a scheduled joining point determined by the matching processing unit 2013. The scheduled joining point is, for example, a place of departure specified by the riding user through a riding reservation request or route change request, or a nearby point. The scheduled joining point field may be filled in with any one of longitude and latitude, address, a landmark name and the like as information on the scheduled joining point, for example. The scheduled joining time field is filled in with a scheduled joining time determined by the matching processing unit 2013. The scheduled joining time is, for example, the departure time specified by the riding user with the riding reservation request or route change request, or a time calculated through inverse calculation from the scheduled arrival time of the destination specified by the riding user with the riding reservation request.

The passing spot and destination fields are filled in with the passing spot and destination specified by the riding user with the riding reservation request or route change request. The scheduled passing spot arrival time and scheduled destination arrival time fields are filled in with scheduled times of arrival at the passing spot and destination specified by the riding users with the riding reservation request or route change request. The scheduled times of arrival at the passing spot and destination are, for example, times specified with the riding reservation request or route change request, or times calculated by the route generation unit 2014. When no passing spot is specified with the riding reservation request or route change request, the passing spot field and the scheduled passing spot arrival time field are vacant. When there are a plurality of passing spots, the passing spot field and scheduled passing spot arrival time field are also provided in plurality.

The fellow passenger presence or absence field is filled in with information indicating the presence or absence of a fellow passenger. The information indicating the presence or absence of a fellow passenger is, for example, a flag, "Yes" or "No" or an ID of a person wanting a ride who is a fellow passenger. The "fellow passengers" refer to, for example, the driving user or riding users whose scheduled riding period (period from the scheduled joining time to the scheduled time of arrival at the destination) partially or totally overlaps according to the riding reservation information. The information stored in the fellow passenger presence or absence field is registered or updated in the newly registered riding reservation information and overlapping riding reservation information when, for example, the presence or absence of riding reservation information that partially or totally overlaps with the newly registered riding reservation information, the driving user ID and the scheduled riding period is determined and if overlapping riding reservation information exists.

An entry of a riding reservation 1 in the example illustrated in FIG. 7 indicates that a riding user C001 joins a vehicle driven by a driving user S001 at 8:00 at a point f and the driving user S001 drives the vehicle toward a destination g.

Entries of a riding reservation 2 and a riding reservation 3 illustrated in FIG. 7 indicate that the scheduled riding period from the scheduled joining time to the scheduled arrival time overlaps with that of the driving user S002, and riding users C002 and C003 are fellow passengers.

The entries of the riding reservation 2 and the riding reservation 3 illustrated in FIG. 7 indicate that the riding user C002 joins the vehicle driven by the driving user S002 at 8:30 at a point h, the driving user S002 drives the vehicle toward a point i and further allows the riding user C003 to get in the same vehicle at 8:45 at a point i. Furthermore, it is indicated that the driving user S002 further drives the vehicle toward a destination j of the riding user C003, allows the riding user C003 to get off the vehicle at a point j, and then drives the vehicle toward a destination e of the riding user C002. Note that the riding reservation information table is not limited to the table illustrated in FIG. 7.

<Processing Flow>

Figure 8:
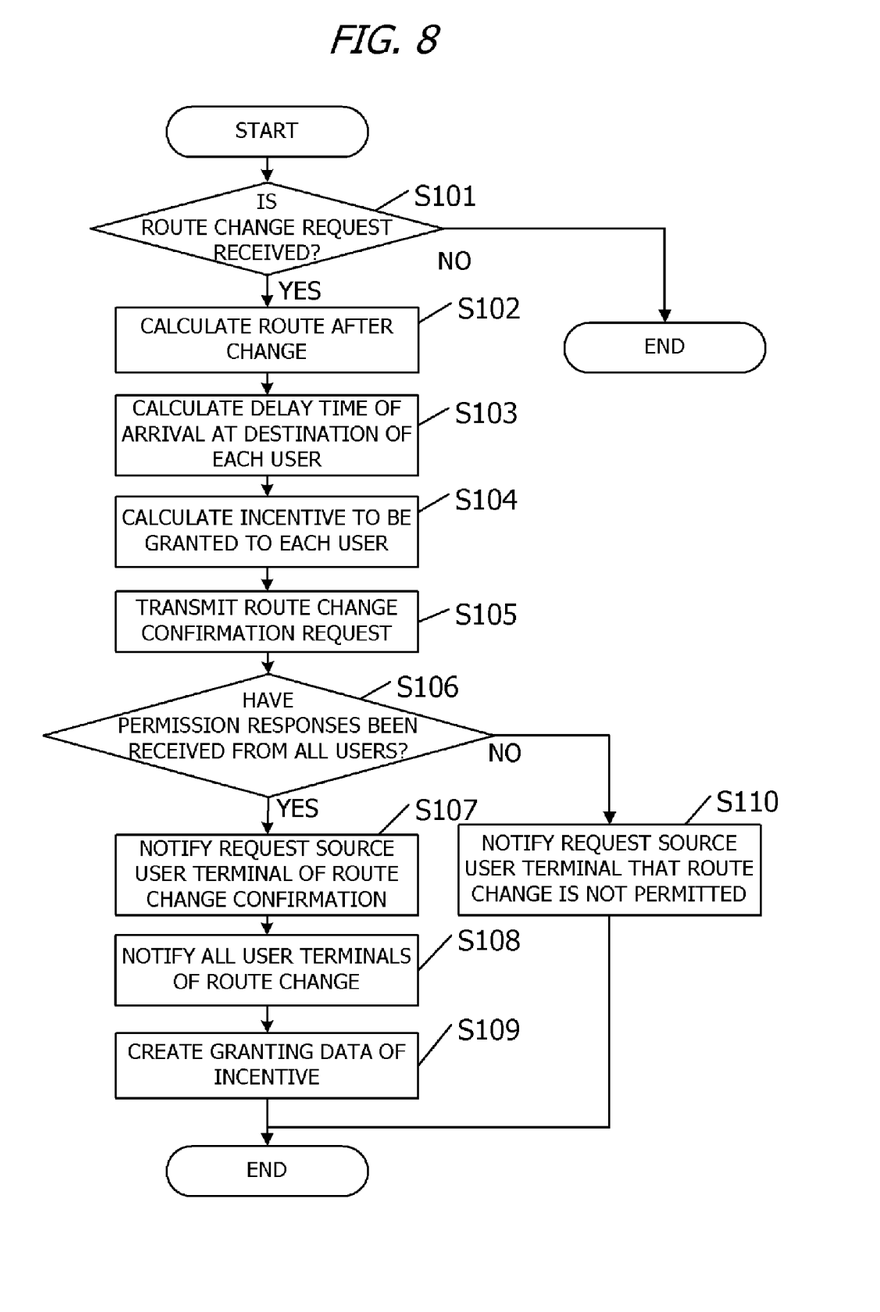
FIG. 8 is an example of a flowchart of processing associated with a route change request of the management server according to the first embodiment.

FIG. 8 is an example of a flowchart of processing associated with a route change request of the management server 20 according to the first embodiment. The processing illustrated in FIG. 8 is repeatedly executed, for example, in a predetermined period. The execution subject of the processing illustrated in FIG. 8 is the control unit 101 of the management server 20, but the reservation processing unit 2012 which is a functional component will be described as the subjects for convenience' sake.

In S101, the reservation processing unit 2012 determines via the terminal communication unit 2011 whether or not a route change request is received from the user terminal 10. When the route change request is received from the user terminal 10 (S101: YES), the process proceeds to S102. When no route change request is received from the user terminal 10 (S101: NO), the process illustrated in FIG. 8 ends.

In S102, the reservation processing unit 2012 requests that the route generation unit 2014 generate a route after change of a change target of the route change request and acquires route information after change. In S103, the reservation processing unit 2012 compares the route information after change with the route information before change and calculates delay times of arrival at destinations of the other users ride who share the vehicle the request source user of the route change request. The route information before change (e.g., scheduled time of arrival at the destination) is acquired, for example, from the riding reservation information DB 2023. The process in S103 is an example of "calculating one or more delay times of arrival at one or more destinations of the one or more second users accompanying the change in the traveling route."

In S104, the reservation processing unit 2012 calculates incentives to be granted to the other users who share the vehicle with the request source user of the route change request according to delay times of arrival at the respective destinations. The incentives to be granted to the other users are determined within a range specified by the provided incentive information received together with the route change request. The incentives to be granted to the other users are determined such that the longer the delay times of arrival at the respective destinations is, the higher the incentive values become, for example. However, without being limited to this, the incentives may be determined such that the same incentive value is granted to the other users. The process in S104 is an example of "determination of one or more incentives to be granted to the one or more second users among the two or more users accompanying a change in the traveling route."

In S105, the reservation processing unit 2012 transmits a route change confirmation request to the user terminals 10 of the other users who share the vehicle with the request source user of the route change request. Together with the route change confirmation request, information on the incentives granted and delay times of arrival at the respective destinations are also transmitted. The process in S105 is an example of "presentation of incentive information on the one or more determined incentives and one or more inquiries about whether or not to accept the change in the traveling route to the one or more second users."

In S106, the reservation processing unit 2012 determines whether or not responses to the route change confirmation requests received from the user terminals 10 of the other users who share the vehicle with the request source user of the route change request are permission responses from all the other users. When the responses to the route change confirmation requests are permission responses from all the other users (S106: YES), the process proceeds to S107. When at least one of the other users is a reject response (S106: NO), the process proceeds to S110. In S110, the reservation processing unit 2012 transmits a route change impossibility notification to the request source user terminal 10 via the terminal communication unit 2011. The request source users who receive the route change impossibility notification may cause the incentives that can be provided to have higher values or change the destinations to different ones to make a route change request over again. After that, the process illustrated in FIG. 8 ends.

In S107, the reservation processing unit 2012 transmits a route change confirmation notification to the request source user terminal 10 via the terminal communication unit 2011. In S108, the reservation processing unit 2012 transmits route change notifications to the user terminals 10 of the other users who share the vehicle with the request source user and the user terminal 10 of the request source via the terminal communication unit 2011. New route information is also transmitted together with the route change notifications.

In S109, the reservation processing unit 2012 creates granting data for granting an incentive to each user. The reservation processing unit 2012 outputs the granting data for each user to the incentive management unit 2015 and the incentive management unit 2015 adds the notified incentive to the possessed incentives of each user in the incentive information DB 2022. Furthermore, the reservation processing unit 2012 creates collection data for collecting the incentive from the route change request source user. The reservation processing unit 2012 outputs the created collection data to the incentive management unit 2015 and the incentive management unit 2015 deletes the notified incentive from the possessed incentives of the request source user in the incentive information DB 2022. After that, the process illustrated in FIG. 8 ends. The process in S109 is an example of "creation of granting data for granting the determined incentive to the one or more second users."

<Operations and Effects of First Embodiment>

In the first embodiment, when a route change request is generated, it is possible to make it easy to obtain agreement on the route change by presenting an incentive granted by permitting the route change to the other users who share the vehicle with the route change request source user.

According to the first embodiment, the incentive granted to the other ride sharing users when the route change is confirmed is provided from the route change request source user. This makes it possible to prevent route changes from being requested indiscriminately.

In the first embodiment, an incentive to be granted to the other ride sharing users when the route change is confirmed is determined according to delay times of arrival at destinations. It is thereby possible to reduce the feeling of unfairness among the other users sharing the same vehicle and make it easier to obtain agreement on the route change.

In the first embodiment, delay times of arrival at destinations are also presented to the other ride sharing users, and so the other ride sharing users can determine whether or not to permit the route change according to the respective delay times.

Other Embodiments

The embodiment described above is an example, and the present disclosure may be changed and carried out as appropriate without departing from the gist of the present disclosure.

In the first embodiment, the vehicle used for a ride sharing service has been described as a vehicle manually driven by a driving user, but the embodiment is not limited to this. An autonomously driving vehicle may also be used for the ride sharing service. When an autonomously traveling vehicle is used, an instruction for a route change after the route change is confirmed is transmitted to, for example, a computer mounted on the autonomously traveling vehicle. A notification of the route change to the riding users (e.g., S108 in FIG. 8) may be transmitted not to each user terminal 10 but to the autonomously traveling vehicle, outputted to an input/output apparatus such as a display installed in the vehicle and informed to the riding users.

In the first embodiment, incentives granted to the other ride sharing users at the time of a route change are determined in accordance with a delay time of arrival at each user's destination, but the determination of the incentives is not limited to this. For example, incentives to be granted to the other ride sharing users at the time of a route change may be determined in accordance with differences in a traveling distance to a destination of each user before and after the route change. Incentives to be granted to the other ride sharing users at the time of a route change may be determined in accordance with a delay time of arrival at a destination and differences in a traveling distance to a destination of each user before and after the route change. It is also possible to acquire an allowable time for a delay time of arrival at a destination of each user in advance and exempt each user from granting an incentive if the delay time of arrival at the destination falls within the allowable time range. This reduces burden of the route change request source user. Furthermore, the allowable time of each user may be presented to the user terminal 10 of the route change request source user.

In the first embodiment, incentives to be granted to the other ride sharing users at the time of a route change are provided by the route change request source user, but without being limited to this, the incentives may be provided by the ride sharing service providing system 1.

In the first embodiment, a route change is not permitted unless responses to the route change confirmation requests are received from all the other ride sharing users, but determination of whether or not to permit a route change is not limited to this. For example, it may also be possible to determine that the route change is confirmed when the number of permission responses from the other ride sharing users reaches a predetermined threshold.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:
1. An information processing apparatus comprising:
a storage storing information on incentives each user possesses, and
a processor coupled to the storage, the processor being programmed to:
receive request data which is a request relating to a change in a traveling route of a vehicle from a first user among two or more users traveling in the vehicle and first incentive information indicating one or more first incentives that are designated by the first user and that the first user can provide to one or more second users who are a part of or all of the two or more users excluding the first user;

determine one or more incentives to be granted to the one or more second users among the two or more users accompanying the change in the traveling route within a range of the one or more first incentives;

present incentive information on the one or more determined incentives and one or more inquiries about whether or not to accept the change in the traveling route to the one or more second users; and create granting data for granting the one or more determined incentives to the one or more second users when the one or more second users accept the change in the traveling route.

2. The information processing apparatus according to claim 1, wherein the processor is further programmed to:

calculate one or more delay times of arrival at one or more destinations of the one or more second users accompanying the change in the traveling route; and determine the one or more incentives to be granted to the one or more second users in accordance with the one or more delay times of arrival at the one or more destinations of the one or more second users.

3. The information processing apparatus according to claim 1, wherein the processor is further programmed to:

calculate one or more delay times of arrival at one or more destinations of the one or more second users accompanying the change in the traveling route; and present the one or more delay times of arrival at the one or more destinations of the one or more second users.

4. An information processing method including:

receiving request data which is a request relating to a change in a traveling route of a vehicle from a first user among two or more users traveling in the vehicle and first incentive information indicating one or more first incentives that are designated by the first user and that the first user can provide to one or more second users who are a part of or all of the two or more users excluding the first user;

determining one or more incentives to be granted to the one or more second users among the two or more users accompanying the change in the traveling route within a range of the one or more first incentives;

presenting incentive information on the one or more determined incentives and one or more inquiries about whether or not to accept the change in the traveling route to the one or more second users; and creating granting data for granting the one or more determined incentives to the one or more second users when the one or more second users accept the change in the traveling route.

5. An information processing system comprising:

a storage storing information on incentives each user possesses, and a processor coupled to the storage, the processor being programmed to:

receive a request relating to a change in a traveling route of a vehicle from a first user among two or more users traveling in the vehicle and first incentive information indicating one or more first incentives that are designated by the first user and that the first user can provide to one or more second users who are a part of or all of the two or more users excluding the first user;

determine one or more incentives to be granted to the one or more second users among the two or more users accompanying the change in the traveling route within a range of the one or more first incentives;

present incentive information on the one or more determined incentives and one or more inquiries about whether or not to accept the change in the traveling route to the one or more second users; and create granting data for granting the one or more determined incentives to the one or more second users when the one or more second users accept the change in the traveling route.

* * * * *